United States Patent [19]

Hakkers et al.

[11] Patent Number: 5,428,214
[45] Date of Patent: Jun. 27, 1995

[54] CONTACTLESSLY OPERATING ELECTRONIC RESPONDER CARD

[75] Inventors: Albert J. Hakkers, Groenlo; Willem O. de Jong, Winterswijk, both of Netherlands

[73] Assignee: N.V. Nederlandsche Apparatenfabriek Nedap, De Groenlo, Netherlands

[21] Appl. No.: 60,126

[22] Filed: May 11, 1993

[30] Foreign Application Priority Data

May 11, 1992 [NL] Netherlands ............... 9200835

[51] Int. Cl.$^6$ .................. G06K 19/06; G06K 7/08
[52] U.S. Cl. ........................... 235/492; 235/449
[58] Field of Search ............ 235/492, 451, 441, 487, 235/488, 449; 902/26; 343/867, 788; 336/65, 208, 225, 200; 40/27.5

[56] References Cited

U.S. PATENT DOCUMENTS

| | | | |
|---|---|---|---|
| 4,334,227 | 6/1982 | Marks | 343/867 X |
| 4,656,450 | 4/1987 | Jarosz et al. | 336/208 X |
| 5,111,199 | 5/1992 | Tomoda et al. | 235/492 X |
| 5,166,502 | 11/1992 | Rendleman et al. | 235/492 |
| 5,184,209 | 2/1993 | Kodai et al. | 235/380 X |
| 5,283,423 | 2/1994 | Venambre et al. | 235/492 |

FOREIGN PATENT DOCUMENTS 0180380 5/1986 European Pat. Off.
9100347 3/1992 Netherlands.

*Primary Examiner*—Donald Hajec
*Assistant Examiner*—Karl D. Frech
*Attorney, Agent, or Firm*—Jacobson, Price, Holman & Stern

[57] ABSTRACT

A contactlessly operating electronic responder card comprises an electronic circuit incorporated into the card and an antenna coil incorporated into the card. According to the invention, the antenna coil is made from thin insulated wire which is wound in a winding space formed by a very thin flexible coil bobbin, whilst the coil bobbin further comprises a chamber into which the electronic circuit has been incorporated and the antenna coil and the electronic circuit are covered by finishing material.

17 Claims, 3 Drawing Sheets

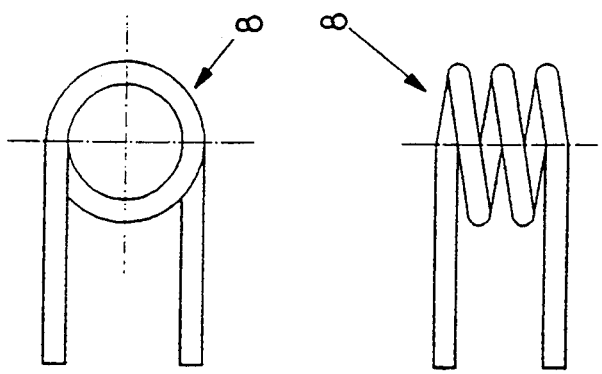
FIG. 1A (PRIOR ART)
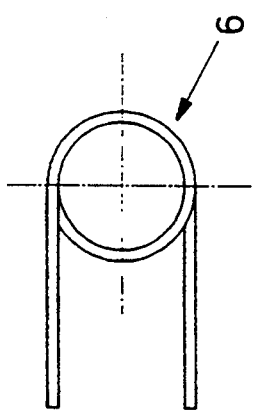
FIG. 1B (PRIOR ART)
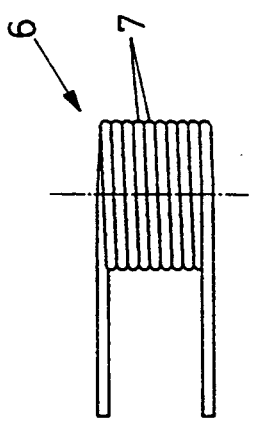
FIG. 1C (PRIOR ART)
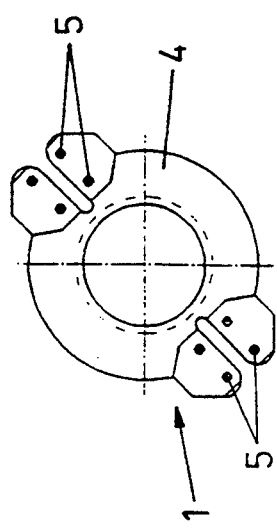
FIG. 1D (PRIOR ART)
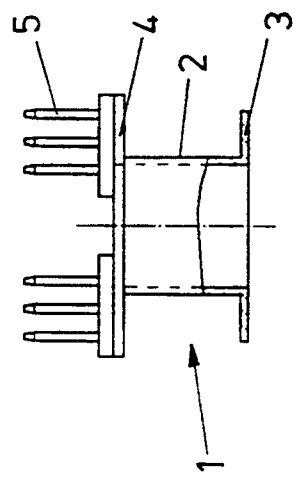
FIG. 1E (PRIOR ART)
FIG. 1F (PRIOR ART)

CONTACTLESSLY OPERATING ELECTRONIC RESPONDER CARD

BACKGROUND OF THE INVENTION

This invention relates to a contactlessly operating electronic responder card comprising an electronic circuit incorporated into the card and an antenna coil incorporated into the card.

Contactlessly operating responder cards of the type described above also referred to as "chip cards" are known per se, for instance from DE-C-3721822 and from NL-A-9100176, and can be used for a variety of purposes. Possible applications include the use as identity card, bank pass, admission card, identification label, credit card, telephone card etc. Since such cards, labels or passes often represent a non-negligible (money) value, such cards etc. are generally, and also hereinafter, designated by the term value document.

A problem in the manufacture of a value document of the above-described type is that the value document should be thin and slightly flexible to satisfy the requirements to be met in normal use. However, an antenna coil, and particularly an antenna coil that covers a great portion of the surface of the value document, is difficult to manufacture or to integrate into the value document in such a manner that the antenna coil does not adversely affect the desired flexibility and the desired minor thickness dimension of the value document. A relatively large antenna coil is required if data transmission between the card and a transmitter/receiver at a relatively large distance of, for instance, more than 50 cm is desired, and particularly if the value document should be able to function without a battery of its own.

In known coil constructions, the following main principles can be distinguished. 1) A rigid coil construction on the basis of a so-called coil bobbin, which is a form-determining part around which the wire is wound. 2) A coil construction utilizing so called thermoadhesive wire, in which the windings are stuck to each other at an increased temperature by means of an adhesive layer. 3) A coil construction in which a form-retaining wire of such thickness is used that the form of the coil is thereby retained.

The drawbacks of the known coil constructions for use in a value document are the limited flexibility, or the space required, as well as the influence of the material of the coil on the form of the value document, which, for instance, manifests itself inter alia in flatness and form retention in the case of fluctuations in the temperature. The object of the invention is to realize a flexible coil construction which does not have the above-mentioned drawbacks, and which is generally suitable for use in a thin and flexible value document of the above-described type.

SUMMARY OF THE INVENTION

This object can be accomplished by not giving the windings of the coil a permanent bond with the surrounding material of the value document, so that the coil maintains sufficient freedom of movement and the mechanical interaction between the surrounding parts remains limited. Accordingly, the flatness and form retention of the value document in the case of temperature fluctuations are mainly determined by the material surrounding the coil.

According to the invention, a contactlessly operating electronic responder card of the above-described type is characterized in that the antenna coil is made from thin insulated wire which is wound in a winding space formed by a very thin flexible coil bobbin, whilst the coil bobbin further comprises a chamber into which the electronic circuit has been incorporated and the antenna coil and the electronic circuit are covered by finishing material.

Hereinafter the invention will be further elucidated with reference to the accompanying drawings of some exemplary embodiments.

BRIEF DESCRIPTION OF THE DRAWINGS

FIGS. 1A to 1F schematically show some examples of known coil constructions;

DETAILED DESCRIPTION OF THE PREFERRED EMBODIMENTS

Figure 2:
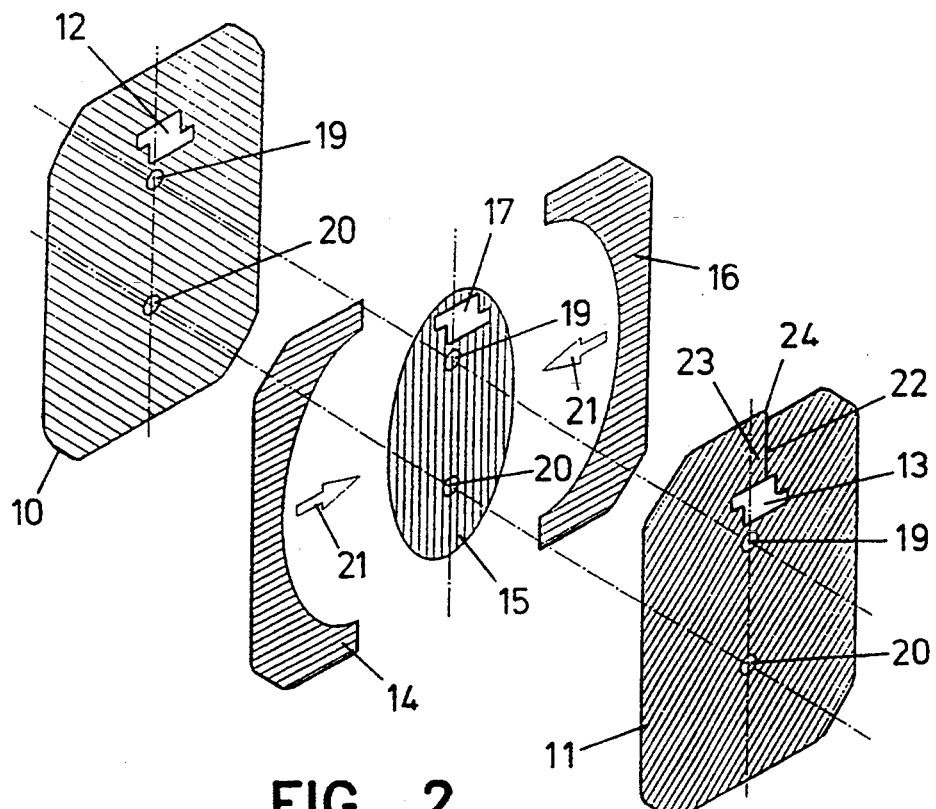
FIG. 2 schematically shows an exploded view of a first embodiment of a coil configuration according to the invention.

FIGS. 1A to 1F schematically show by way of example, three known coil constructions, both in top plan view and in side elevational view. FIGS. 1A and 1D show a top plan view and a side elevational view of a coil bobbin 1 comprising a cylindrical part 2 provided, at the two ends thereof, with transverse flanges 3, 4, between which a wire can be wound onto the cylindrical part. Further, connecting pins 5 are shown. The coil bobbin is not flexible and has a length which is of the same order of magnitude as its diameter. A coil formed with such a coil bobbin is clearly unsuitable for use in a thin flexible responder card.

FIGS. 1B and 1E show a top plan view and a side elevational view of a self-supporting coil 6, formed from thermoadhesive wire. The windings 7 have been firmly interconnected at increased temperature by means of an adhesive layer, yielding a substantially rigid construction. Such a coil, too, is not very suitable for use in a thin flexible responder card.

FIG. 1C and 1F, finally, schematically show a top plan view and a side elevational view of a coil 8 formed from a thick form-retaining wire, which cannot be made of flexible construction either.

FIG. 2 schematically shows a perspective exploded view of an exemplary embodiment of a coil configuration according to the invention; however, for clarity, the windings of the coil have not been drawn. The configuration shown in fact constitutes a holder for an antenna coil to be wound in a manner to be described hereinafter.

FIG. 2 shows two flexible, substantially identically-shaped plate-shaped parts 10, 11. Since the total thickness of the responder card to be manufactured should not exceed 760 $\mu$m in accordance with the current ISO standards, the thickness of the plate-shaped parts 10 and 11 may be about 125–175 $\mu$m in a practical embodiment. A suitable plastics is polycarbonate, which is strong, scratch-resistant and flexible. Other plastics, such as for instance polyester, can be used as well. PVC seems less suitable because this material breaks relatively easily when bent. The plate-shaped parts are each provided with a recess 12, 13, which is more or less Z-shaped in this example. These Z-shaped recesses 12, 13 are in line and in the finished product they form a chamber for an integrated electronic circuit (chip), together with a corresponding recess in the core 14, 15, 16, to be described hereinafter, located between the plate-shaped parts.

Figure 3:
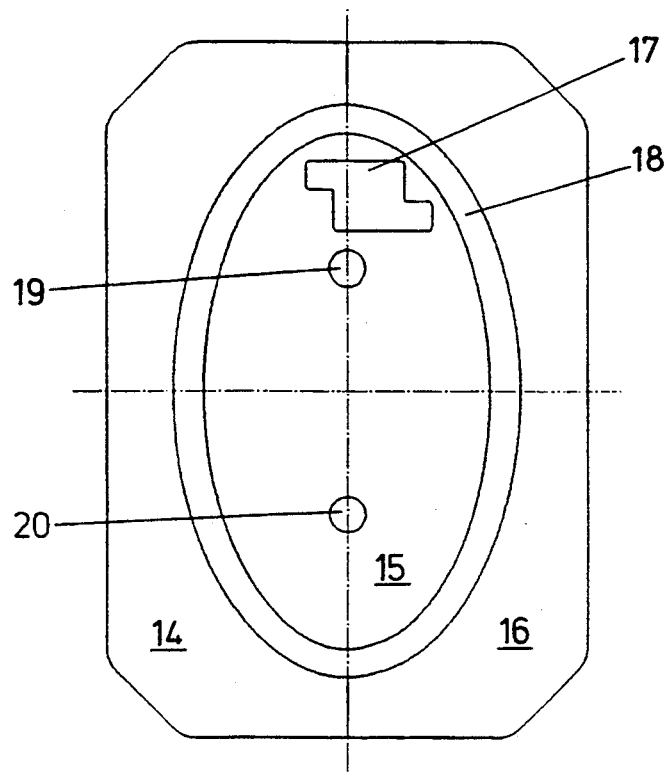
FIG. 3 schematically shows an elevational view of a part of FIG. 2 in finished condition.

The core located between the plate-shaped parts comprises a plate-shaped inner core 15, of oval shape in the embodiment shown, provided with a recess 17, and two approximately U-shaped outer core halves 14 and 16, which, in assembled condition, as shown in FIG. 3, enclose the inner core while leaving clear a circumferential gap 18 which accommodates the antenna coil in the finished product.

The core parts 14, 15, 16 can advantageously be made from the same material as the parts 10 and 11 and may also have the same thickness. However, this is not strictly necessary. The core parts, like the plate-shaped parts 10, 11, can be punched in the desired shape from a sheet of plastics material.

To manufacture the antenna coil proper, the plate-shaped part 10 or front plate, and the plate-shaped part 11 or back plate, with the inner core 15 therebetween, are mounted in a winding machine, preferably between two clamping plates (not shown) which have been clamped together. In order to position and fix the various parts relative to each other, in the embodiment shown the front and back plate and the inner core are each provided with two holes 19, 20, through which extend two pins, not shown, in the winding position of the assembly.

The parts as positioned and clamped in the manner described in fact constitute a very flat coil bobbin, the front and the back plates constituting the end flanges between which a space is present for a coil of the thickness of the inner core.

The coil is subsequently formed from thin insulated wire being wound between the front and back plates and around the inner core. The number of windings may be large, for instance of the order of 100 or more. After the coil has been wound, the outer core halves 14 and 16 are fitted on either side between the front and back plates, as indicated schematically in FIG. 2 by arrows 21. Here, the outer contour of the front and back plates and the outer core halves, respectively, may serve as an aid in positioning the outer core halves. As can be seen in FIG. 2, the back plate 11 is slightly different from the front plate 10 in that an incision 22 has been provided in the back plate, extending from the circumference to the recess 13. The incision makes it possible to momentarily bend away the adjacent portion of the back plate, for instance the part indicated at 23, as a kind of tab or flap, so as to guide the ends of the wound coil to the recess 13.

Preferably, at the location of the incision, the circumferential line of the back plate recedes over a short distance, as shown at 24, so that the beginning of the incision can be clearly identified and the flap or tab 23 can be readily gripped.

After the antenna coil has been wound in the manner described and the outer core halves have been fitted, the core parts and the front and back plates are interconnected. This is preferably effected while the front plate, the core parts and the back plate are still disposed between the clamping plates. Preferably, the clamping plates can be detached from the winding tools for that purpose.

To enable the front and back plates to be connected to the core parts, the core parts are provided with a suitable adhesive layer on opposite sides. This may for instance be a layer of glue which can be activated by means of pressure and/or heat. Although it is also possible to provide the front plate and/or the back plate with an adhesive layer, special measures must then be taken to prevent adhesion of the wound coil to the front and/or back plate. If only the core parts are provided with an adhesive layer, this problem hardly occurs, if at all. In the example shown, the coil ends connected to the integrated circuit do come to lie in the adhesive layer. This, however, does not affect flexibility.

After the front and back plates and the core parts have been laminated to each other in the manner described, the wound coil is located free within the gap-shaped space 18. The windings of the coils can move relative to each other and also relative to the front and back plates, so that a flexible whole is obtained. If the responder card, and hence the coil, is bent to some extent, the wires of the coil can spring back without any difficulty.

After the integrated circuit has been connected to the coil ends and has been placed in the chamber 12, 13, 17, covering layers may be provided on opposite sides, likewise by a laminating technique. The covering layers close off the chamber 12, 13, 17 and may, if so desired, be printed before or after lamination. Finally, the responder card obtained can be given the desired external form by means of a punching operation.

If during lamination a slight adhesion has occurred between the wound coil and the surrounding material, then such adhesion can be removed by bending the card slightly a few times.

Figure 5:
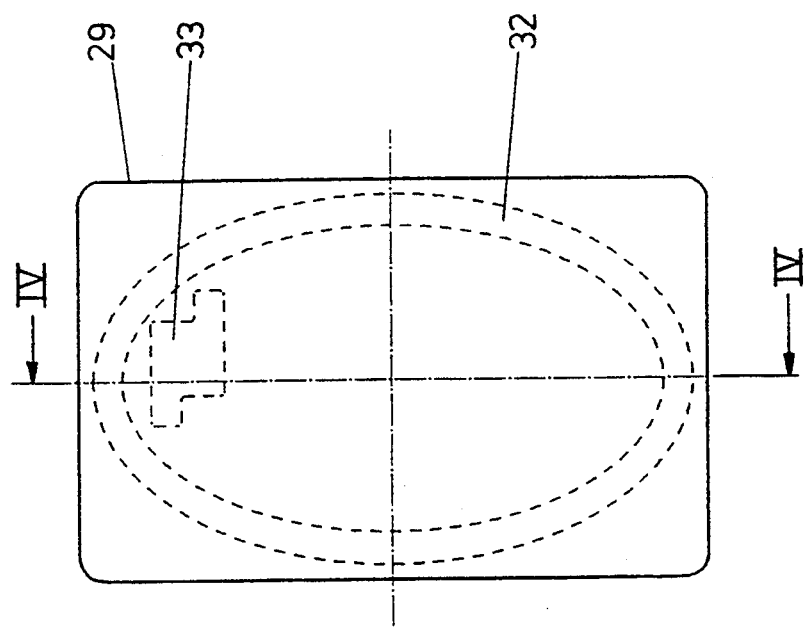
FIG. 5 shows an elevational view of the responder card of FIG. 4.
Figure 4:
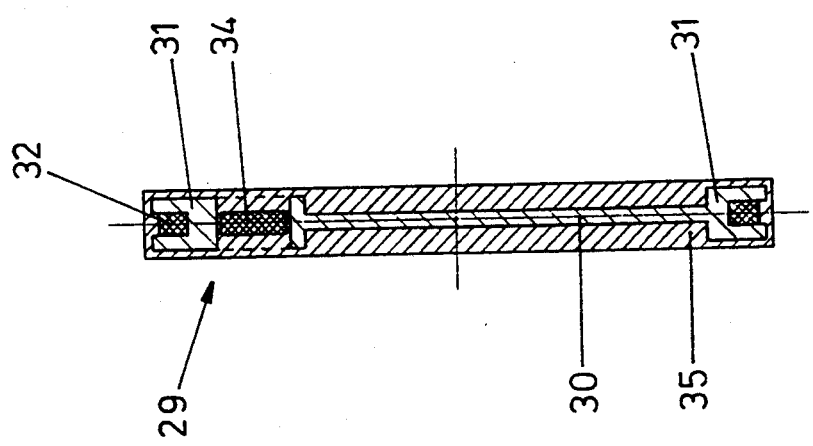
FIG. 4 schematically shows a cross-sectional view, taken on the line IV—IV in FIG. 5, of a second embodiment of a coil configuration for use in a responder card according to the invention.

According to an alternative method of producing a value document according to the invention, it is possible to start from a very thin flexible coil bobbin, injection-molded from plastics material, this coil bobbin having more or less the shape of the composite of front plate, back plate and core of FIG. 2. Instead of using a laminating technique as described above, it is also possible to effect the finishing of the document by enveloping the part that has been wound and provided with electronics in plastics by means of an injection molding process, optionally utilizing foaming additives so as to make a low spraying pressure possible and to prevent shrink phenomena. The result will be a stress-free product with a substantially freely disposed antenna coil. Such a technique is particularly suitable if the thin flexible coil bobbin is not flat. The above is illustrated in detail in FIG. 4. For clarity, the thickness in the sectional view of FIG. 4 has been chosen to be considerably larger than the real thickness of about 0.76 mm. FIG. 4 shows a cross-sectional view, taken on the line IV—IV in FIG. 5, of an exemplary embodiment of a responder card 29 according to the invention, in which a preformed coil bobbin has been used. The coil bobbin has a thin central portion 30, which has a thicker circumferential edge 31 of U-shaped cross-section. The U-shaped circumferential edge is open towards the exterior, but could in principle also be open towards one of the flat sides of the responder card to be formed. Wound in the circumferential edge is an antenna coil 32 of thin insulated wire.

The central portion further comprises a recess 33 (FIG. 5), in which an integrated circuit 34 has been arranged. In order to form a flat card, the coil bobbin provided with an antenna coil and an electronic circuit is embedded in a casing 35 of plastics material, applied, for instance, by injection molding. The casing is substantially flat on the outside and can be printed and/or be provided with covering layers that may or may not be printed. Optionally, marks in relief can be provided, as is often the case with credit cards. The coil construction according to the invention adds to the advantage of great flexibility the advantage that a large number of windings is possible, giving a relatively large electromagnetic quality factor or Q-factor. This promotes the possibility of providing the electronics in the document with energy in a contactless manner from a transmitter/receiver, which provides for the information transfer. On account of restrictions with respect to the maximum permissible electromagnetic field strength that may be emitted, this occurs preferably at lower frequencies of 120 kHz, for instance.

It is observed that after the foregoing, various modifications will readily occur to a person of ordinary skill in the art. Thus, if so desired, the chamber for the integrated circuit could be located outside the antenna coil. Also, the chamber could be connected to the winding space by means of an open slot. Further, additional recesses may be provided in the central portion of the preformed coil bobbin 30.

We claim:

1. A contactlessly operating electronic responder card comprising an electronic circuit incorporated into the card and an antenna coil incorporated into the card, wherein the antenna coil is made from thin insulated wire which is wound in a winding space formed by a very thin flexible coil bobbin, while the coil bobbin further comprises a chamber into which the electronic circuit has been incorporated, the antenna coil and the electronic circuit being covered by finishing material and wherein windings of said antenna coil are not permanently bonded with surrounding material of the card, so that the antenna coil maintains freedom of movement within the winding space.

2. The contactlessly operating electronic responder card according to claim 1, wherein the flexible coil bobbin is composed of a front plate, a back plate and plate-shaped inner core part clamped between the front plate and the back plate, the coil being wound around the inner core part between the front plate and the back plate, while around the coil a plurality of outer core parts are arranged between the front plate and the back plate, these outer core parts enclosing the coil.

3. The contactlessly operating electronic responder card according to claim 2, wherein the front plate and the back plate and at least one of the core parts are provided with openings located in line for forming the chamber for accommodating the electronic circuit.

4. The contactlessly operating electronic responder card according to claim 3, wherein the opening in said at least one of the core parts is located in the inner core part.

5. The contactlessly operating electronic responder card according to claim 3, wherein the front plate or the back plate comprises an incision extending from a circumferential edge to the opening for forming the chamber, so as to form a laterally bendable flap.

6. The contactlessly operating electronic responder card according to claim 5, wherein the contour of the circumferential edge recedes at the location of the incision.

7. The contactlessly operating electronic responder card according to claim 2, wherein opposite sides of the inner core part and opposite sides of the outer core parts are provided with an adhesive layer which can be activated by heat and/or pressure.

8. The contactlessly operating electronic responder card according to claim 2, wherein the front plate, the back plate and the inner core part are provided with a plurality of positioning openings located in line.

9. The contactlessly operating electronic responder card according to claim 2, wherein the front plate and the back plate comprise a covering layer provided by lamination.

10. The contactlessly operating electronic responder card according to claim 2, wherein the assembly of front plate, back plate, inner core part, coil, outer core parts and electronic circuit is embedded in a plastics casing provided through injection molding.

11. The contactlessly operating electronic responder card according to claim 2, wherein the front plate, the back plate and the core parts have been punched from plastics sheet material of a thickness of from about 125 $\mu$m to 175 $\mu$m.

12. The contactlessly operating electronic responder card according to claim 1, wherein the flexible coil bobbin is made of polycarbonate.

13. The contactlessly operating electronic responder card according to claim 1, wherein the flexible coil bobbin has been made in one piece through injection molding and comprises a substantially flat central portion which is provided with a circumferential edge of U-shaped cross-section for accommodating the windings of the antenna coil.

14. The contactlessly operating electronic responder card according to claim 13, wherein the circumferential edge is thicker than the central portion.

15. The contactlessly operating electronic responder card according to claim 14, wherein the coil bobbin, together with the antenna coil and the electronic circuit, has been embedded, by injection molding, in a plastics casing substantially flat on the outside.

16. A contactlessly operating electronic responder card comprising an electronic circuit incorporated into the card and an antenna coil incorporated into the card, wherein the antenna coil is made from thin insulated wire which is wound in a winding space formed by a very thin flexible coil bobbin, while the coil bobbin further comprises a chamber into which the electronic circuit has been incorporated, the antenna coil and the electronic circuit being covered by finishing material;

wherein the flexible coil bobbin is composed of a front plate, a back plate and plate-shaped inner core part clamped between the front plate and the back plate, the coil being wound around the inner core part between the front plate and the back plate, while around the coil a plurality of outer core parts are arranged between the front plate and the back plate, these outer core parts enclosing the coil;

wherein the front plate and the back plate and at least one of the core parts are provided with openings located in line for forming the chamber for accommodating the electronic circuit; and wherein the front plate or the back plate comprises an incision extending from a circumferential edge to the opening for forming the chamber, so as to form a laterally bendable flap.

17. The contactlessly operating electronic responder card according to claim 16, wherein the contour of the circumferential edge recedes at the location of the incision.

* * * * *